United States Patent
Orita et al.

(10) Patent No.: US 9,242,375 B2
(45) Date of Patent: Jan. 26, 2016

(54) CONTROL DEVICE FOR POWER DEVICE

(75) Inventors: Atsuo Orita, Wako (JP); Yoshinari Takemura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 13/512,944

(22) PCT Filed: Sep. 22, 2010

(86) PCT No.: PCT/JP2010/066427
§ 371 (c)(1),
(2), (4) Date: May 31, 2012

(87) PCT Pub. No.: WO2011/067976
PCT Pub. Date: Jun. 9, 2011

(65) Prior Publication Data
US 2012/0239198 A1    Sep. 20, 2012

(30) Foreign Application Priority Data

Dec. 2, 2009   (JP) ................... 2009-274351

(51) Int. Cl.
  B25J 9/18    (2006.01)
  B25J 9/16    (2006.01)
  B25J 13/08   (2006.01)
  B25J 9/00    (2006.01)

(52) U.S. Cl.
  CPC ............. *B25J 9/1641* (2013.01); *B25J 9/0015* (2013.01); *B25J 9/1633* (2013.01); *B25J 13/088* (2013.01); *G05B 2219/41251* (2013.01)

(58) Field of Classification Search
  CPC . H02P 31/00; H02P 21/0003; H02P 23/0004; H02P 23/005; H02P 23/0077; H02P 2205/05; B25J 13/00; B25J 13/088; B25J 9/0015; B25J 9/1025; B25J 9/1633; B25J 9/1641; B25J 9/1653; B05B 2219/41251; G05B 6/00; G05B 6/02
  USPC ............ 700/41, 43, 260, 261; 318/9, 15, 567, 318/615, 616, 654, 655, 433, 400.39; 135/41, 43, 260, 261
  See application file for complete search history.

(56) References Cited

U.S. PATENT DOCUMENTS

| 4,535,277 | A  | * | 8/1985 | Kurakake | ...................... 318/561 |
| 5,036,266 | A  | * | 7/1991 | Burke    | ........................... 318/646 |
| 6,515,442 | B1 | * | 2/2003 | Okubo et al. | ................. 318/560 |

FOREIGN PATENT DOCUMENTS

| JP | 61-151714   | 7/1986  |
| JP | 61-251915   | 11/1986 |
| JP | 62-077608   | 4/1987  |
| JP | 2005-349555 | 12/2005 |
| JP | 2008-055541 | 3/2008  |

OTHER PUBLICATIONS

Kleijn, IR. C., "Torsion Bar 1.0", 2008, Controllab Products B.V., p. 7.*

* cited by examiner

*Primary Examiner* — Spencer Patton
(74) *Attorney, Agent, or Firm* — Rankin, Hill & Clark LLP

(57) ABSTRACT

A power device 1 has a speed reducer 3 and a spring member 4 provided in a power transmission system between an actuator 2 and a driven element 5, an operation target of the actuator 2 is determined according to a linear combination of values that are obtained by passing through low-pass filters, a deviation $\Delta\omega 12$ between an estimated value $\omega 1\_e$ of a velocity of an input unit 4a of the spring member 4 and an estimated value $\omega 2\_e$ of a velocity of the driven element 5, and a deviation $\Delta\theta\mathrm{def}$ between a value $\theta\mathrm{def}\_s$ of a deviation between the input unit 4a of the spring member 4 and the driven element 5, and a target value $\theta\mathrm{def}\_\mathrm{cmd}$ of the displacement difference corresponding to a target driving force $\tau\mathrm{ref}$ of the driven element 5.

6 Claims, 4 Drawing Sheets

WORKING EXAMPLE

COMPARATIVE EXAMPLE

CONTROL DEVICE FOR POWER DEVICE

BACKGROUND OF THE INVENTION

1. Field of the Invention

The present invention relates to a device which controls a driving force to be imparted to a driven element, such as a link of a robot, from an actuator.

2. Related Background Art

In a power device for driving a joint mechanism of a robot, in order to provide flexibility to the joint mechanism, there is known a type in which a spring member is provided between a power output unit of the actuator and a driven element of the joint mechanism.

For example, in Patent Document 1, there is disclosed a power device which is configured so as to transmit a rotational driving force of a motor via a pulley and a speed reducer, and a damping element-elastic element system comprising a damper and a spring, in this order. Thereafter, in the technique shown in Patent Document 1, a target torque of the motor is determined on the basis of a target link angle, a measured value of the link angle, and a measured value of a rotational angle of the motor, and an output torque of the motor is controlled by the target torque. In this case, the target torque of the motor is determined by adding a feedback value corresponding to a deviation between the target link angle and the link angle measured value, to a feedforward value.

PRIOR ART REFERENCE

Patent Document

[Patent Document 1] Japanese Patent Laid-Open No. 2005-349555

SUMMARY OF THE INVENTION

Problems to Be Solved by the Invention

In the power device as is explained above, a strain wave gearing such as a Harmonic Drive (registered trademark) is mainly used as the speed reducer of a power transmission system between an actuator such as the motor and the driven element.

This type of the strain wave gearing has some elastic characteristics in the power transmission system of the device because of its structure. Therefore, in the power device which transmits the power of the actuator to the driven element via the strain wave gearing and the spring member, not only the spring member but also the strain wave gearing is included in the transmission system as an element which has elastic characteristics, that is, element which easily vibrates. As such, in such a power device, vibration caused by a resonance phenomenon and the like is easily generated, and consequently, vibration of the driving force transmitted to the driven element from the actuator is easily generated. Therefore, in order to appropriately control the driving force transmitted to the driven element to the target driving force, it becomes necessary to effectively suppress the vibration of the driving force caused by the elastic characteristics of both of the strain wave gearing and the spring member.

In this case, in the technique shown in Patent Document 1, although consideration is given to suppress the vibration caused by the elastic characteristics of the spring member, there is no care taken with respect to the elastic characteristics of the strain wave gearing included as the speed reducer between the motor and the link of the robot. Therefore, there is an inconvenience that a situation where the vibration of the power transmission system between the motor and the link, and consequently, the vibration of the driving torque of the link may not be suppressed sufficiently is likely to occur.

The present invention has been made in view of the above background, and aims to provide a control device of a power device, in which the power device includes two power transmission elements having elastic characteristics in a power transmission system between an actuator and a driven element, the control device being capable of effectively suppressing vibration of driving power transmitted from the actuator to the driven element, and also imparting target driving force stably to the driven element.

Means for Solving the Problems

To attain an object described above, the present invention provides a control device of a power device, the power device including an actuator, a first power transmission element having an elastic characteristics with an input unit thereof being connected to a power output unit of the actuator, a second power transmission element with an input unit thereof being connected to an output unit of the first power transmission element and which converts and outputs a power imparted to the input unit to an elastic force, and a driven element which is connected to an output unit of the second power transmission element, and which performs an operational movement by a driving force transmitted from the actuator via the first power transmission element and the second power transmission element, in which the first power transmission element has the elastic characteristics of a higher rigidity (is more rigid) than the second power transmission element, and the control device controlling the driving force actually imparted to the driven element from the actuator to a target driving force, the control device comprising:

a primary side displacement measuring element which generates an output indicating a measured value of an actual displacement of the input unit of the second power transmission element;

a secondary side displacement measuring element which generates an output indicating a measured value of an actual displacement of the driven element;

a primary side-secondary side displacement difference measuring element which generates an output indicating a measured value of a primary side-secondary side displacement difference which is a difference between the actual displacement of the input unit of the second power transmission element and the actual displacement of the driven unit;

a primary side velocity estimating element which generates an estimated value of a primary side velocity which is the actual velocity of the input unit of the second power transmission element, at least based on the measured value of the primary side displacement;

a secondary side velocity estimating element which generates an estimated value of a secondary side velocity which is the actual velocity of the driven element, at least based on the measured value of the secondary side displacement;

a first filtering element which generates a first filtering value which is obtained by performing a filtering process of a low-pass characteristics to a deviation between the measured value of the secondary side velocity and the measured value of the primary side velocity;

a second filtering element which generates a second filtering value which is obtained by performing the low-pass filtering process to a deviation between a value of an elasticity measured amount, which is either one of the measured value of the primary side-secondary side deviation or an elastic force converted value which is obtained by converting the measured value of the primary side-secondary side deviation to an elastic force generated by the second power transmission element, and a target value of the elasticity measured amount defined by the target driving force;

an actuator operation target determining element which determines an operation target defining an operation of the actuator according to a linear combination of the first filtering value and the second filtering value; and an actuator control element which controls the operation of the actuator according to the determined operation target (a first aspect of the invention).

The power output by the actuator and the driving force imparted to the driven element may be either of a rotational force (torque) and a translational force.

In the first aspect of the invention, the operation target is determined according to the linear combination of the first filtering value generated by the first filtering element and the second filtering value generated by the second filtering element. Thereafter, the operation of the actuator is controlled according to the operation target.

The subject of the low-pass filtering process by the first filtering element is the deviation between the measured value of the secondary side velocity and the measured value of the primary side velocity, that is, the deviation between the velocity of the input unit of the second power transmission element connected to the output unit of the first power transmission element, and the velocity of the driven element connected to the output unit of the second power transmission element. Therefore, the subject of the low-pass filtering process by the first filtering element becomes the one according to the temporal rate of change of the elastic force actually imparted from the second power transmission element to the driven element.

Further, the subject of the low-pass filtering process by the second filtering element is the deviation between the measured value of the primary side-secondary side displacement difference and the target value of the primary side-secondary side displacement difference defined by the target driving force, or the deviation between the elastic force converted value which is obtained by converting the measured value of the primary side-secondary side displacement difference to the elastic force generated by the second power transmission element, and the target value of the elastic force (that is, the target driving force). Therefore, the subject of the low-pass filtering process by the second filtering element becomes the one according to the error of the elastic force actually imparted from the second power transmission element to the driven element with respect to the target driving force.

The relationship between the elastic force generated by the second power transmission element and the primary side-secondary side displacement difference becomes an existing relationship depending on the elastic characteristics of the second power transmission element, so that the measured value of the primary side-secondary side displacement difference may be converted to the elastic force of the second power transmission element, or to the target value of the primary side-secondary side displacement difference, on the basis of the relationship.

To supplement, the filtering process of each of the first filtering element and the second filtering element may include, as the subject of the filtering process, a process of multiplying a gain of a predetermined value.

As is explained above, the subject of the low-pass filtering process by the first filtering element becomes the one according to the temporal rate of change of the elastic force actually imparted from the second power transmission element to the driven element. Further, the subject of the low-pass filtering process by the second filtering element becomes the one according to the error of the elastic force actually imparted from the second power transmission element to the driven element with respect to the target driving force.

Further, the first filtering element and the second filtering element may individually set the cut-off frequency or the gain of the respective filtering process.

Therefore, by setting the cut-off frequency or the gain appropriately, the first filtering element and the second filtering element may determine the operation target so as to be capable of effectively suppressing the driving force transmitted from the actuator to the driven element from vibrating which is caused by the elastic characteristics of both of the first power transmission element and the second power transmission element.

Therefore, according to the first aspect of the invention, it becomes possible to control the driving force imparted to the driven element to the target driving force stably, while effectively suppressing the vibration of the driving force transmitted from the actuator to the driven element.

In the first aspect of the invention, the first power transmission element and the second power transmission element having elastic characteristics may take various modes according to the type of the actuator, the operating form of the driven element and the like. As one example of a representative mode, a mode in which the first power transmission element is a speed reducer, and the second power transmission element is a spring member may be given (a second aspect of the invention).

The power device according to the second aspect of the invention is of a structure in which the power output from the actuator is transmitted to the driven element via the speed reducer and the spring member in this order, so that the versatility of the present invention may be enhanced.

In this case, as a representative example of the speed reducer having the elastic characteristics of a higher rigidity compared to the spring member, a strain wave gearing such as a Harmonic Drive (registered trademark) may be given. Also, as a representative example of the spring member, a coil spring and a torsion bar may be given.

The speed reducer may include a mechanism of performing conversion from the rotational force to the translational force, or a conversion from the translational force to the rotational force. Further, the speed reducer may include, for example in addition to the strain wave gearing, for example a power transmission mechanism of a structure in which a plurality of gears are meshed together, or a power transmission mechanism in which a sprocket and a chain are combined, and the like.

Further, the second power transmission element may be a one configured from a force sensor such as a torque sensor equipped with an elastic body which functions as the spring member.

In the first aspect of the invention and the second aspect of the invention, basically, it is preferable to generate the estimated value of the secondary side velocity to follow the first-order differential value of the measured value of the secondary side displacement (a first-order differential value by time).

In this case, as a more specific mode in relation to the generation of the estimated value of the secondary side velocity, a following mode may be adopted.

That is, in one mode, the secondary side velocity estimating element is configured as an element which generates a value obtained by performing the low-pass filtering process to a first-order differential value of the measured value of the secondary side displacement as the estimated value of the secondary side velocity (a third aspect of the invention).

According to the third aspect of the invention, a value which is obtained by performing a low-pass filtering process to the first-order differential value of the measured value of the secondary side displacement, that is, a value obtained by removing the high-frequency component from the first-order differential value, is generated as the estimated value of the secondary side velocity. By doing so, the estimated value of the secondary side velocity may be generated so as to follow the first-order differential value of the measured value of the secondary side displacement, and also so as not to generate excessive fluctuation of the estimated value.

In the third aspect of the invention, it is preferable that the cut-off frequency in the low-pass filtering process performed to the first-order differential value of the measured value of the secondary side displacement is set so as to be able to remove the vibration component caused by the elastic characteristics of the first power transmission element (resonant frequency component) and the vibration component caused by the elastic characteristics of the second power transmission element (resonance frequency component) from the first-order differential value. In this case, because the elastic characteristics of the first power transmission element is the elastic characteristics of a higher rigidity than the elastic characteristics of the second power transmission element, the vibration component caused by the elastic characteristics of the first power transmission element generally has higher frequency than the vibration component caused by the elastic characteristics of the second power transmission element. Therefore, by setting the cut-off frequency to a frequency lower than the vibration component caused by the elastic characteristics of the second power transmission element, the vibration component caused by the elastic characteristics of the first power transmission element may consequently be removed.

Further, in another mode related to the generation of the estimated value of the secondary side velocity, the control device further comprises: a secondary side velocity basic estimated value generating element which estimates a driven element acting force which is a force actually acting on the driven element, on the basis of at least the measured value of the primary side-secondary side displacement difference, and which generates a value proportional to a value of integral of the estimated value of the driven element acting force as a basic estimated value of the secondary side of velocity; and a third filtering element which generates a secondary side velocity filtering value which is a value obtained by performing the low-pass filtering process to the first-order differential value of the measured value of the secondary side displacement. Further, the secondary side velocity estimating element is configured as an element which calculates a correction manipulated variable of the basic estimated value of the secondary side velocity, according to a deviation between the secondary side displacement filtering value and the generated estimated value of the secondary side velocity, so as to converge the deviation to 0 by a feedback control law, and which generates a value obtained by correcting the basic estimated value by the correction manipulated variable as the estimated value of the secondary side velocity (a fourth aspect of the invention).

According to the fourth aspect of the invention, the basic estimated value of the secondary side velocity generated by the secondary side velocity basic estimated value generating element as a value proportional to the value of integral of the estimated value of the driven element acting force (a value obtained by multiplying a proportional constant of a predetermined value to the value of integral) has a meaning as an approximate estimated value of the secondary side velocity on the basis of the dynamic relationship (model) between the driven element acting force and the operation of the driven element.

That is, because the relationship between a movement acceleration of the driven element (rotational angular acceleration or translational acceleration) and the driven element acting force becomes a dynamically proportional relationship, the value of integral of the driven element acting force becomes proportional to the velocity of the driven element, that is, the secondary side velocity. Further, because the elastic force generated by the second power transmission element at least acts on the driven element, it becomes possible to estimate the driven element acting force at least on the basis of the measured value of the primary side-secondary side displacement difference. Therefore, by the process of the secondary side velocity basic estimated value generating element, the basic estimated value of the secondary side velocity may be generated.

In this case, the basic estimated value of the secondary side velocity is a value proportional to the value of integral of the driven element acting force, so that excessive fluctuation of the basic estimated value may be suppressed.

And in the fourth aspect of the invention, the secondary side velocity estimating element generates a value obtained by correcting the basic estimated value by the correction manipulated variable as the estimated value of the secondary side velocity. In this case, the correction manipulated variable is calculated, according to the deviation between the secondary side velocity filtering value which is a value obtained by performing the low-pass filtering process to the first-order differential value of the measured value of the secondary side displacement and the generated estimated value of the secondary side velocity (more preferably, a latest value of the generated estimated value of the secondary side velocity), so as to converge the deviation to 0 by the feedback control law.

By doing so, it becomes possible to generate the estimated value of the secondary side velocity to follow the first-order differential value of the measured value of the secondary side displacement, and also so as not to generate excessive fluctuation of the estimated value. In this case, in the fourth aspect of the invention, because the basic estimated value functions as a feedforward estimated value of the secondary side velocity, it becomes possible to reduce the influence of the measurement error of the secondary side displacement and the like, and to improve reliability and stability of the estimated value of the secondary side velocity.

In the fourth aspect of the invention, it is preferable that the cut-off frequency in the low-pass filtering process performed to the first-order differential value of the measured value of the secondary side displacement is set, as is the same as in the case of the third aspect of the invention, so as to be able to remove the vibration component caused by the elastic characteristics of the first power transmission element and the vibration component caused by the elastic characteristics of the second power transmission element from the first-order differential value.

In the fourth aspect of the invention, in the case where the external force acting on the driven element (including frictional force) other than the elastic force generated by the second power transmission element is 0, or sufficiently small compared to the elastic force, then with respect to the estimation of the driven element acting force by the secondary side velocity basic estimated value generating element, the elastic force converted value obtained by converting the measured value of the primary side-secondary side displacement difference to the elastic force generated by the second power transmission element may be generated as the estimated value of the driven element acting force.

However, generally, there are cases where the external force acting on the driven element other than the elastic force generated by the second power transmission element becomes relatively large. And, in the case where such external force acts on the driven element, it is desirable that the estimation of the driven element acting force is performed while adding the external force.

In this case, with respect to estimation of the driven element external force, it is preferable that the secondary side velocity basic estimated value generating element comprises: an element which generates the elastic force converted value which is obtained by converting the measured value of the primary side-secondary side displacement difference to the elastic force generated by the second power transmission element; an element which calculates a force deviation which is a deviation between an elastic force filtering value which is obtained by performing the low-pass filtering process to the elastic force converted value, and an acting force basic filtering value which is obtained by performing the low-pass filtering process to a value obtained by converting a second-order differential value of the measured value of the secondary side displacement to the force acting on the driven element; and an element which calculates an estimated value of the driven element acting force by correcting the elastic force converted value according to the force deviation (a fifth aspect of the invention).

According to the fifth aspect of the invention, the secondary side velocity basic estimated value generating element calculates the force deviation which is a deviation between the elastic force filtering value and the acting force basic filtering value.

As is explained above, the dynamic relationship between the movement acceleration of the driven element (rotational angular acceleration or translational acceleration) and the driven element acting force becomes a proportional relationship, so that the second-order differential value of the measured value of the secondary side velocity basically becomes proportional to the driven element acting force. Therefore, generally, the elastic force converted value obtained by converting the measured value of the primary side-secondary side displacement difference to the elastic force generated by the second power transmission element, and a value obtained by converting the second-order differential value of the measured value of the secondary side displacement to the force acting on the driven element (a value obtained by multiplying a proportional constant of a predetermined value to the second-order differential value) corresponds to the external force acting on the driven element other than the elastic force generated by the second power transmission element.

However, the second-order differential value of the measured value of the secondary side displacement easily receives influence of the measurement error of the secondary side velocity. Therefore, in the fifth aspect of the invention, the secondary side velocity basic estimated value generating element calculates the force deviation, which is a deviation between the elastic force filtering value which is obtained by performing the low-pass filtering process to the elastic force converted value and the acting force basic filtering value which is obtained by performing the low-pass filtering process to a value obtained by converting the second-order differential value of the measured value of the secondary side displacement to the force acting on the driven element, as the value corresponding to the estimated value of the external force. By doing so, it becomes possible to calculate the force deviation having high reliability as the value corresponding to the estimated value of the external force, without generating excessive fluctuation.

Thereafter, the secondary side velocity basic estimated value generating element calculates the estimated value of the driven element acting force, by correcting the elastic force converted value according to the force deviation. In this case, the correction of the elastic force converted value may be performed, for example, by adding a value obtained by multiplying a gain of a predetermined value (gain equal to or less than 1) to the force deviation, to the elastic force converted value.

In the fifth aspect of the invention, the secondary side velocity basic estimated value generating element generates the value proportional to the value of integral of the estimated value of the driven element acting force as the basic estimated value. In this case, the estimated value of the driven element acting force is the estimated value in which the external force acting on the driven element other than the elastic force generated by the second power transmission element is added thereto, so that the error of the basic estimated value with respect to the actual secondary side velocity may be made small. Consequently, it becomes possible to further improve the reliability and stability of the estimated value of the secondary side velocity generated by the secondary side velocity estimating element.

To supplement, in the fifth aspect of the invention, it is preferable that the frequency characteristics such as the cut-off frequencies of the low-pass filtering process performed to the elastic force converted value and also to the value obtained by converting the second-order differential value of the measured value of the secondary side displacement to the force acting on the driven element are identical (including the case where these are approximately identical). In this case, the process of calculating the deviation between the elastic force filtering value and the acting force basic filtering value is equivalent to the process of calculating the deviation between the elastic force converted value and the second-order differential value of the measured value of the secondary side displacement to the force acting on the driven element, and performing the low-pass filtering process to the deviation.

Further, in the fifth aspect of the invention, it is preferable that the cut-off frequency in the low-pass filtering process performed to the elastic force converted value and also to the value obtained by converting the second-order differential value of the measured value of the secondary side displacement to the force acting on the driven element, and the cut-off frequency in the low-pass filtering process performed to the first-order differential value of the measured value of the secondary side displacement are set so as to be able to remove the vibration component caused by the elastic force characteristics of the first power transmission element and the vibration component caused by elastic force characteristics of the second power transmission element. These cut-off frequencies may be different from the cut-off frequency of the filtering process of the third filtering element.

In the first through fifth aspects of the present invention, it is preferable that the estimated value of the primary side velocity is generated so that the estimated value of the primary side velocity follows the first-order differential value of the measured value of the primary side displacement.

In this case, as a more specific mode, for example the following mode may be adopted. That is, in order to realize the operation target, the control device further comprises: a power target parameter generating element which generates a power target parameter which defines a target power to be output from the power output unit of the actuator in order to realize the operation target, at least according to the operation target; a target power filtering element which generates a target power filtering value which is obtained by performing the low-pass filtering process to the target power defined by the power target parameter; and a correcting element which calculates a correction manipulated variable of the target power filtering value, according to a deviation between the first-order differential value of the measured value of the primary side displacement and the generated estimated value of the position side velocity, so as to converge the deviation to 0 by a feedback control law, and corrects the target power filtering value by the correction manipulated variable. And the primary side velocity estimating element is configured as an element which generates a value proportional to a value of integral of a value after correction of the target power filtering value by the correcting element, as the estimated value of the primary side velocity (a sixth aspect of the invention).

According to the sixth aspect of the invention, the target power filtering value generated by the target power filtering element, that is, the value obtained by performing the low-pass filtering process to the target power defined by the power target parameter corresponds to an approximate estimated value of the power actually output by the actuator from the power output unit thereof.

Further, in the sixth aspect of the invention, the target power filtering value is corrected by the correction manipulated variable, the correction manipulated variable being calculated by the correcting element so as to converge, according to the deviation between the first-order differential value of the measured value of the primary side deviation position and the generated estimated value of a primary side deviation velocity (preferably a latest value of the generated estimated value of the primary side deviation velocity), the deviation to 0 by the feedback control law. And the value after correction is obtained as a value corresponding to the estimated value of the power actually output by the actuator from the power output unit thereof.

The relationship between the power output by the actuator and the movement acceleration of the output unit of the first power transmission element becomes a dynamically proportional relationship, so that the value of integral of the power output by the actuator becomes proportional to the primary side velocity. Therefore, the primary side velocity estimating element generates a value proportional to the value of integral of the value after correction of the target power filtering value (a value obtained by multiplying a proportional constant of a predetermined value to the value of integral) as the estimated value of the primary side velocity.

By doing so, it becomes possible to generate the estimated value of the secondary side velocity to follow the first-order differential value of the measured value of the secondary side displacement. In this case, the estimated value of the primary side velocity is a value proportional to the value of integral of the value after correction of the target power filtering value, so that the excessive fluctuation of the estimated value is suppressed.

In the sixth aspect of the invention, in the case where the actuator control element is configured so as to determine the target power to be output from the power output unit of the actuator according to the operation target, and then perform the operation control of the actuator according to the target power, the power target parameter generating element may be included in the actuator control element.

To supplement, in the first through the sixth aspects of the invention, in the case where the actuator is for example an electric motor, for example a target value of the velocity of the power output unit of the electric motor (for example a rotational angular velocity of an output shaft), or a target value obtained by converting the target value to a velocity of the output unit of the first power transmission element, may be used as the operation target determined by the actuator operation target determining element.

The electric motor may be the motor of a rotary type or a linear motor. And, in this case, it is preferable that the target value of the power such as a torque output by the electric motor is determined as the power target parameter, so as to converge a deviation between the target value of the velocity of the power output unit of the electric motor and the value obtained by converting the estimated value of the primary side velocity to the velocity of the power output unit of the electric motor, or a deviation between the target value obtained by converting the target value of the velocity of the power output unit of the electric motor to the velocity of the output unit of the first power transmission element to 0 by the feedback control law, and control the operation of the electric motor according to the target value.

Because the first power transmission element has the elastic characteristics of a higher rigidity compared to the second power transmission element, the relationship between the velocity of the power output unit of the actuator (the velocity of the input unit of the first power transmission element) and the velocity of the output unit of the first power transmission element (the primary side velocity) becomes a proportional relationship depending approximately on a speed reduction ratio of the first power transmission element. Therefore, the conversion of one of the velocity out of the velocity of the power output unit of the electric motor as the actuator (the velocity of the input unit of the first power transmission element) and the velocity of the output unit of the first power transmission element (the primary side velocity) to the other velocity may be performed according to the speed reduction ratio of the first power transmission element.

DETAILED DESCRIPTION OF THE PREFERRED EMBODIMENTS

An embodiment of the present invention will be explained with reference to FIG. 1 through FIG. 4.

Figure 1:
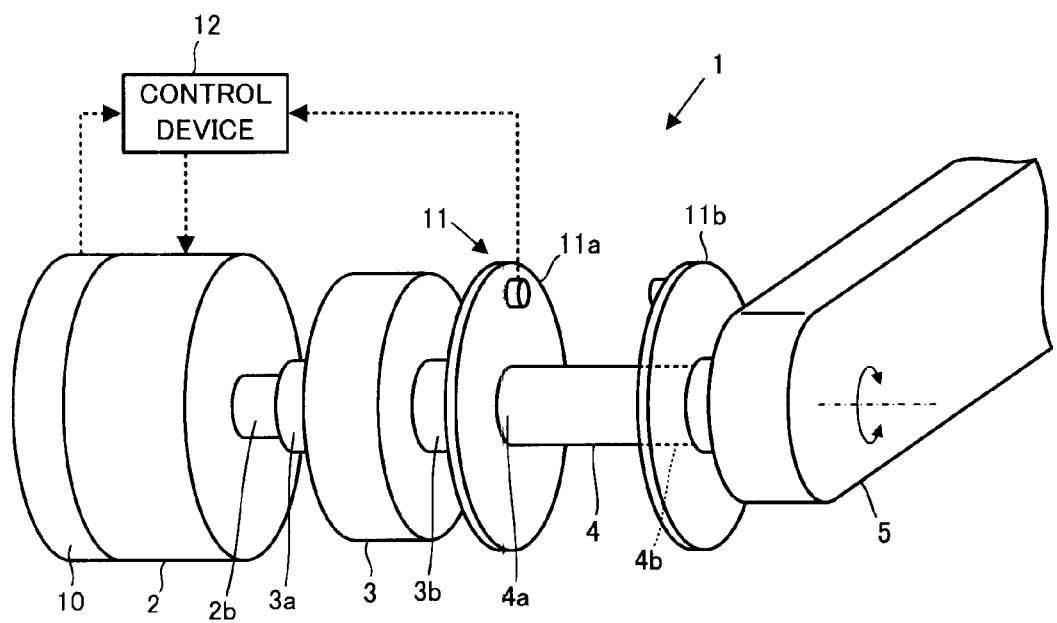
FIG. 1 is a view showing a frame format of a configuration of a power device according to one embodiment of the present invention.

With reference to FIG. 1, a power device 1 of the present embodiment is a device which rotary drives a driven rotary member 5 as a driven element by an electric motor 2, and is equipped with a speed reducer 3 and a torsion bar 4 which is a spring member in a power transmission system between the electric motor 2 and the driven rotary member 5.

In the present embodiment, the electric motor 2, the speed reducer 3, and the torsion bar 4 respectively corresponds to an actuator, a first power transmission element, and a second power transmission element of the present invention. An example of the driven rotary member 5 includes a constituent element of a joint of a robot (a link member capable of freely rotating about a joint axis).

An output shaft 2b as a power output unit of the electric motor 2 is connected with an input shaft (an input unit) 3a of the speed reducer 3 so as to be capable of rotating integrally with the output shaft 2b. An output shaft (an output unit) 3b of the speed reducer 3 is connected with an input side end (an input unit) 4a of the torsion bar 4 so as to be capable of rotating integrally with the output shaft 3b. Further, an output side end (output unit) 4b of the torsion bar 4 is connected with the driven rotary member 5 so as to be able to rotate integrally with the output side end 4b.

In the present embodiment, circular disks 11a, 11b facing each other in the axial direction of the torsion bar 4 are attached to the connecting region between the output shaft 3b of the speed reducer 3 and the torsion bar 4, and the connecting region between the torsion bar 4 and the driven rotary member 5. The circular disks 11a, 11b are constituent elements of a differential encoder 11 explained later, and are provided so as to rotate integrally with the input side end 4a and the output side end 4b of the torsion bar 4, respectively.

With the above-mentioned configuration of the power device 1, a rotational driving force (torque) generated at the output shaft 2b of the electric motor 2 is transmitted to the driven rotary member 5, via the speed reducer 3 and the torsion bar 4 in this order. By doing so, the operation (rotary movement) of the driven rotary member 5 is performed.

In this case, the rotational driving force transmitted from the electric motor 2 to the torsion bar 4 via the speed reducer 3 is converted to an elastic force (torsion force) at the torsion bar 4, and the elastic force is imparted to the driven rotary member 5 as the rotational driving force to the driven rotary member 5. Further, the speed reducer 3 is a strain wave gearing such as a Harmonic Drive (registered trademark) for example, and has elastic characteristics at the power transmission system between the input shaft 3a and the output shaft 3b thereof. However, the elastic characteristics of the speed reducer 3 are of a high rigidity compared to the elastic characteristics of the torsion bar 4.

In the present embodiment, in the power device 1 of the above-mentioned configuration, the operational control of the electric motor 2 is performed so as to make the torque (the rotational driving force) actually transmitted from the electric motor 2 to the driven rotary member 5, that is, the torque actually imparted from the torsion bar 4 to the driven rotary member 5, becomes the target torque.

For the operational control, in the system of the present embodiment, a rotary encoder 10 attached to the electric motor 2, and the differential encoder 11 arranged between the speed reducer 3 and the driven rotary member 5 are provided as sensors, and also a control device 12 including a CPU, a RAM, a ROM and the like is provided.

The rotary encoder 10 is for sensing a rotational angle (a rotational amount from a reference rotational position) of the output shaft 2b of the electric motor 2, and outputs a signal corresponding to the rotational angle.

The differential encoder 11 is for sensing a rotational angular difference between the input side end 4a and the output side end 4b of the torsion bar 4 (that is, a torsion angle between both ends of the torsion bar 4), and has the circular disks 11a, 11b. The differential encoder 11 outputs a signal corresponding to a relative rotational angle between the circular disk 11a and the circular disk 11b (the rotational angle taking a state where the torsion of the torsion bar 4 is not generated as a reference), as a signal corresponding to the rotational angular difference.

To the control device 12, the detection signals of the rotary encoder 10 and the differential encoder 11 are input, and target driving torques τref which is a target value of the driving force to be imparted to the driven rotary member 5 are sequentially input from outside. The control device 12 performs the operational control of the electric motor 2 on the basis of these inputs.

Hereinafter, the control process executed by the control device 12 will be explained in detail.

Figure 2:
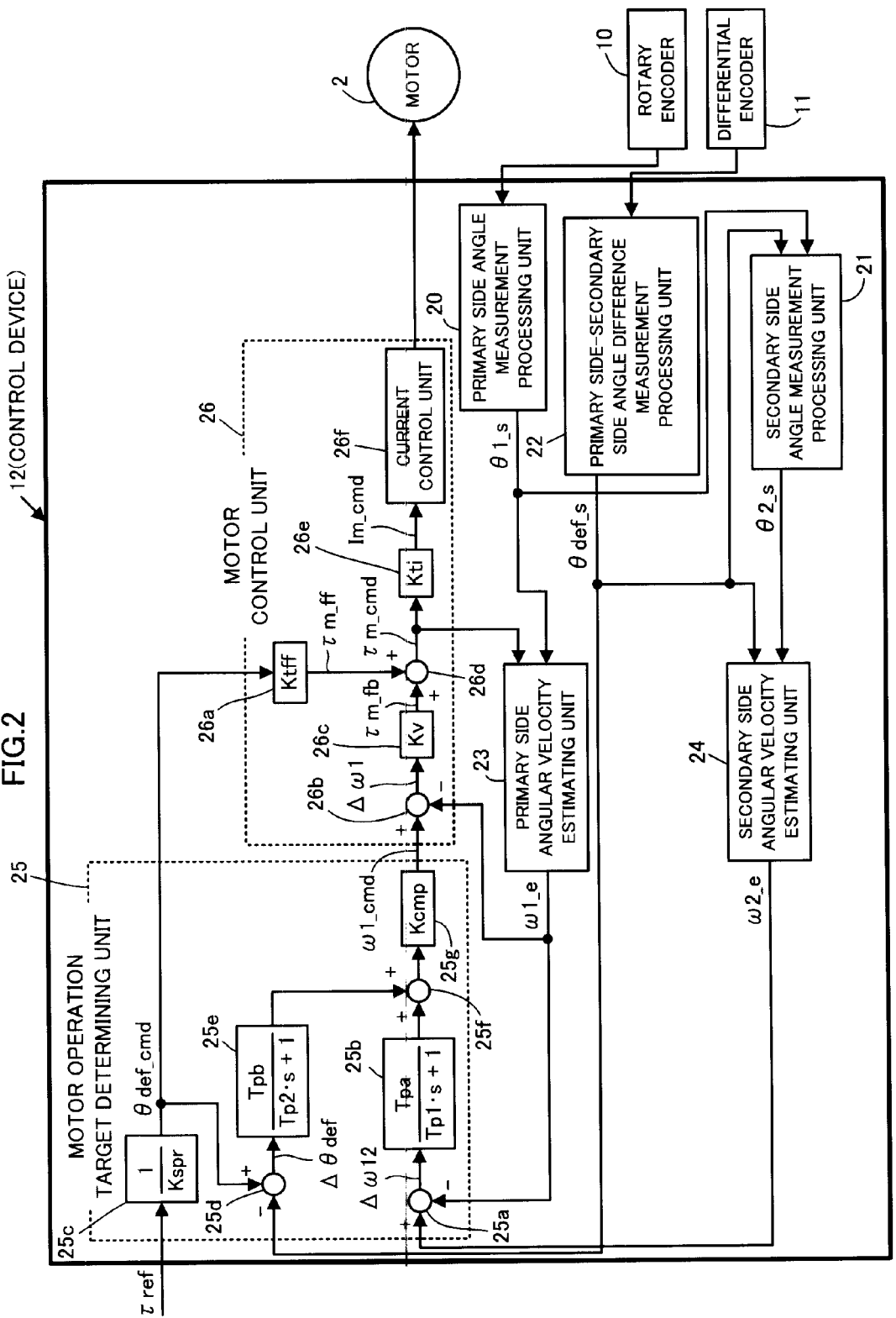
FIG. 2 is a block diagram showing a functional configuration of a control device of the power device of FIG. 1.

With reference to FIG. 2, the control device 12 is equipped with, as functional configurations realized by an implemented program and the like, a primary side angle measurement processing unit 20 which sequentially generates a measured value $\theta 1\_s$ of a primary side rotational angle $\theta 1$ as the rotational angle of the input side end 4a of the torsion bar 4 (=the rotational angle of the output shaft 3b of the speed reducer 3), a secondary side angle measurement processing unit 21 which sequentially generates a measured value $\theta 2\_s$ of a secondary side rotational angle $\theta 2$ as the rotational angle of the driven rotary member 5 (=the rotational angle of the output side end 4b of the torsion bar 4), and a primary side-secondary side angular difference measurement processing unit 22 which sequentially generates a measured value $\theta def\_s$ of a primary side-secondary side angular difference $\theta def$ which is a deviation between the primary side rotational angle $\theta 1$ and the secondary side rotational angle $\theta 2$ (=$\theta 1-\theta 2$).

The primary side-secondary side angular difference $\theta def$ takes the state where the torsion of the torsion bar 4 is not generated as the reference state, and the primary side-secondary side angular difference $\theta def$ in the reference state is set to 0. Therefore, in the reference state, the primary side rotational angle $\theta 1$ and the secondary side rotational angle $\theta 2$ coincide with each other.

Further, the control device 12 is equipped with a primary side angular velocity estimating unit 23 which sequentially generates an estimated value $\omega 1\_e$ of a primary side rotational angular velocity $\omega 1$ as a rotational angular velocity of the input side end 4a of the torsion bar 4, a secondary side angular velocity estimating unit 24 which sequentially generates an estimated value $\omega 2\_s$ of a secondary side rotational angular velocity $\omega 2$ as the rotational angular velocity of the driven rotary member 5, a motor operation target determining unit 25 which sequentially determines an operation target which defines the operation of the electric motor 2, and a motor control unit 26 which performs the operational control of the electric motor 2 according to the operation target.

The control device 12 sequentially executes the process of each functional unit explained above, in a predetermined arithmetic processing cycle as will be explained below.

That is, the control device 12 first executes the processing of the primary side angle measurement processing unit 20, the primary side-secondary side angular difference measurement processing unit 22, and the secondary side angle measurement processing unit 21.

In this case, the detection signals of the rotary encoder 10 are input to the primary side angle measurement processing unit 20. Thereafter, the primary side angle measurement processing unit 20 generates a value obtained by dividing the rotational angle value of the output shaft 2b of the electric motor 2 directly recognized by the input detection signal by a speed reduction ratio R of the speed reducer 3, as a primary side rotational angle measured value θ1_s.

Further, the detection signals of the differential encoder 11 are input to the primary side-secondary side angular difference measurement processing unit 22. Thereafter, the primary side-secondary side angular difference measurement processing unit 22 generates the value of the rotational angular difference between the circular disks 11a, 11b directly recognized by the input detection signal as the primary side-secondary side rotational angular difference measured value θdef_s.

Further, the measured values θ1_s, θdef_s that are respectively generated as is explained above by the primary side angle measurement processing unit 20 and the primary side-secondary side angular difference measurement processing unit 22 are input to the secondary side angle measurement processing unit 21. Thereafter, the secondary side angle measurement processing unit 21 generates a value obtained by subtracting the primary side-secondary side rotational angular difference measured value θdef_s from the primary side rotational angle measured value θ1_s (=θ1_s−θdef_s) as a secondary side rotational angle measured value θ2_s.

To supplement, if arbitrary two out of the rotational angle of the output shaft 2b of the electric motor 2 or the primary side rotational angle θ1, the primary side-secondary side rotational angular difference θdef, and the secondary side rotational angle θ2 are sensed using arbitral sensors, the three kinds of measured values θ1_s, θ2_s, and θdef_s may be obtained from the sensing signals. Therefore, the combination of the sensing subjects for obtaining the three kinds of measured values θ1_s, θ2_s, and θdef_s may be combinations other than the set of the rotational angle of the output shaft 2b of the electric motor 2 and the primary side-secondary side rotational angular difference θdef.

Alternatively, the primary side rotational angle θ1, the primary side-secondary side rotational angular difference θdef, and the secondary side rotational angle θ2 may respectively be sensed independently.

In the present embodiment, the primary side angle measurement processing unit 20, the secondary side angle measurement processing unit 21, and the primary side-secondary side angular difference measurement processing unit 22 corresponds to a primary side displacement measuring element, a secondary side displacement measuring element, and a primary side-secondary side displacement difference measuring element of the present invention, respectively. In this case, the primary side rotational angle θ1, the secondary side rotational angle θ2, and the primary side-secondary side angular difference θdef corresponds to a primary side displacement, a secondary side displacement, and a primary side-secondary side displacement difference of the present invention, respectively.

Subsequently, the control device 12 executes a processing of the primary side angular velocity estimating unit 23 and the secondary side angular velocity estimating unit 24. In order to prevent the rotational driving force transmitted from the electric motor 2 to the driven rotary member 5 from vibrating caused by the elastic characteristics of the speed reducer 3 and the torsion bar 4, or to prevent a convergence of the rotational driving force (convergence with respect to the target value) and the like from dropping caused by disturbance factors such as friction, the estimating units 23, 24 sequentially generate a primary side rotational angular velocity estimated value ω1_e and a secondary side rotational angular velocity estimated value ω2_e while performing adjustment of frequency component and the like.

First, explanation will be given on the processing of the primary side angular velocity estimating unit 23. The latest value of the primary side rotational angle measured value θ1_s is sequentially input from the primary side angle measurement processing unit 20 to the primary side angular velocity estimating unit 23, and also, the latest value of a target value τm_cmd of the output torque of the electric motor 2 as a power target parameter already generated at a control process of the motor control unit 26 (to be explained in detail later) (hereinafter referred to as a target motor torque τm_cmd) is sequentially input to the primary side angular velocity estimating unit 23.

Figure 3:
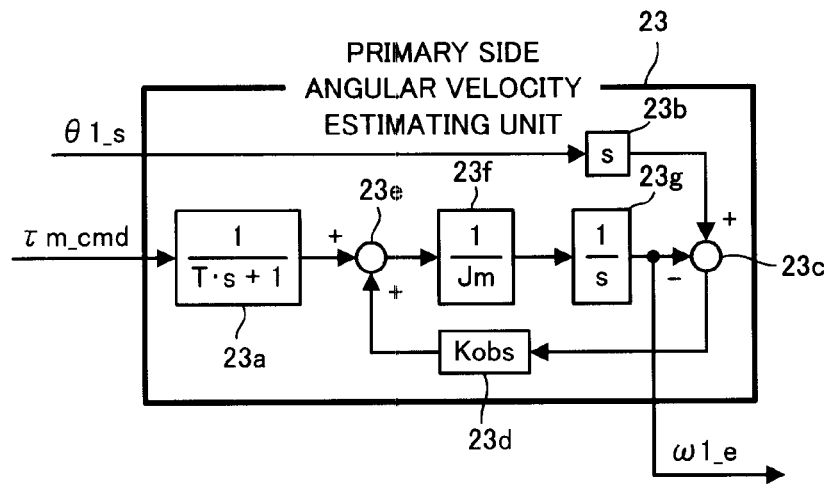
FIG. 3 is a block diagram showing a functional configuration of a primary side angular velocity estimating unit shown in FIG. 2.

Thereafter, the primary side angular velocity estimating unit 23 sequentially generates the primary side rotational angular velocity estimated value ω1_e from these input values by a process shown in the block diagram of FIG. 3.

Specifically, the primary side angular velocity estimating unit 23 inputs the target motor torque τm_cmd of the electric motor 2 sequentially input from the motor control unit 26 to a filter 23a, and performs a filtering process of a low-pass characteristics to the target motor torque τm_cmd by the filter 23a. In this case, the filter 23a is a low-pass filter in which a transfer function thereof is expressed by 1/(T·s+1) (a low-pass filter in which a time constant defining a cut-off frequency is T).

The value of the time constant T is set to a time value shorter than time constants Td, Tw, Tp1, and Tp2 explained later.

Further, the primary side angular velocity estimating unit 23 differentiates the primary side rotational angle measured value θ1_s sequentially input from the primary side angle measurement processing unit 20 by a differentiator 23b to obtain a first-order differentiation. Further, the primary side angular velocity estimating unit 23 executes a process of calculating a deviation between a first-order differential value dθ1_s/dt (a time rate of change of θ1_s) and the latest value of the primary side rotational angular velocity estimated value ω1_e already generated by the primary side angular velocity estimating unit 23 (a previous time value calculated in the previous arithmetic processing cycle of the primary side angular velocity estimating unit 23) (=dθ1_s/dt−ω1_e) by a calculator 23c.

Thereafter, the primary side angular velocity estimating unit 23 calculates a correction manipulated variable for correcting the output value of the filter 23a, so as to converge the deviation calculated by the calculator 23c to 0 by a feedback control law. In this case, as the feedback control law, a proportion rule is used, for example. That is, the primary side angular velocity estimating unit 23 calculates the correction manipulated variable by executing the process of multiplying a proportional gain Kobs of a predetermined value to the deviation calculated by the calculator 23c by a multiplier 23d.

Subsequently, the primary side angular velocity estimating unit 23 corrects the output value of the filter 23a by executing a process of adding the correction manipulated variable to the output value of the filter 23a (a filtering value of the desired motor torque τm_cmd) by a calculator 23e. The value after correction (the output value of the calculator 23e) has a meaning as an estimated value of the total input torque with respect to a rotating system combining the electric motor 2 and the speed reducer 3 (an estimated value of the output torque generated by the electric motor 2).

Subsequently, the primary side angular velocity estimating unit 23 executes a processing of multiplying an inverse number of a predetermined value Jm (=1/Jm) to the output value of the calculator 23e by a multiplier 23f. The predetermined value Jm is a constant value previously set as an equivalent moment of inertia of the rotating system combining the electric motor 2 and the speed reducer 3. Therefore, the output value of the multiplier 23f which becomes a value proportional to the output value of the calculator 23e has a meaning as an estimated value of the rotational angular acceleration of the output shaft 3b of the speed reducer 3.

Thereafter, the primary side angular velocity estimating unit 23 executes a process of integrating the output value of the multiplier 23f by an integrator 23g, and the value of integral is generated as the primary side rotational angular velocity estimated value ω1_e.

With the process of the primary side angular velocity estimating unit 23 mentioned above, the primary side rotational angular velocity estimated value ω1_e is sequentially generated, while suppressing an excessive variation (high-frequency fluctuation) in comparison to the first-order differential value dθ1_s/dt of the primary side rotational angle measured value θ1_s, and also while following the first-order differential value dθ1_s/dt.

To supplement, in the present embodiment, the primary side angular velocity estimating unit 23 corresponds to a primary side velocity estimating element of the present invention. In this case, the primary side rotational angular velocity ω1 corresponds to a primary side velocity of the present invention.

Further, the filter 23a corresponds to a desired power filtering element of the present invention. The desired motor torque τm_cmd which is the input value of the filter 23a, and the output value of the filter 23a corresponds to a target power (or a power target parameter), and the target power filtering value, respectively, of the present invention. Further, a correcting element of the present invention is realized by the differentiator 23b, the calculator 23c, the multiplier 23d and the calculator 23e.

Subsequently, the process of the secondary side angular velocity estimating unit 24 will be explained. A latest value of the secondary side rotational angle measured value θ2_s and a latest value of the primary side-secondary side rotational angular difference measured value θdef_s of the secondary side angle measurement processing unit 21 and the primary side-secondary side angular difference measurement processing unit 22, respectively, are sequentially input to the secondary side angular velocity estimating unit 24.

Figure 4:
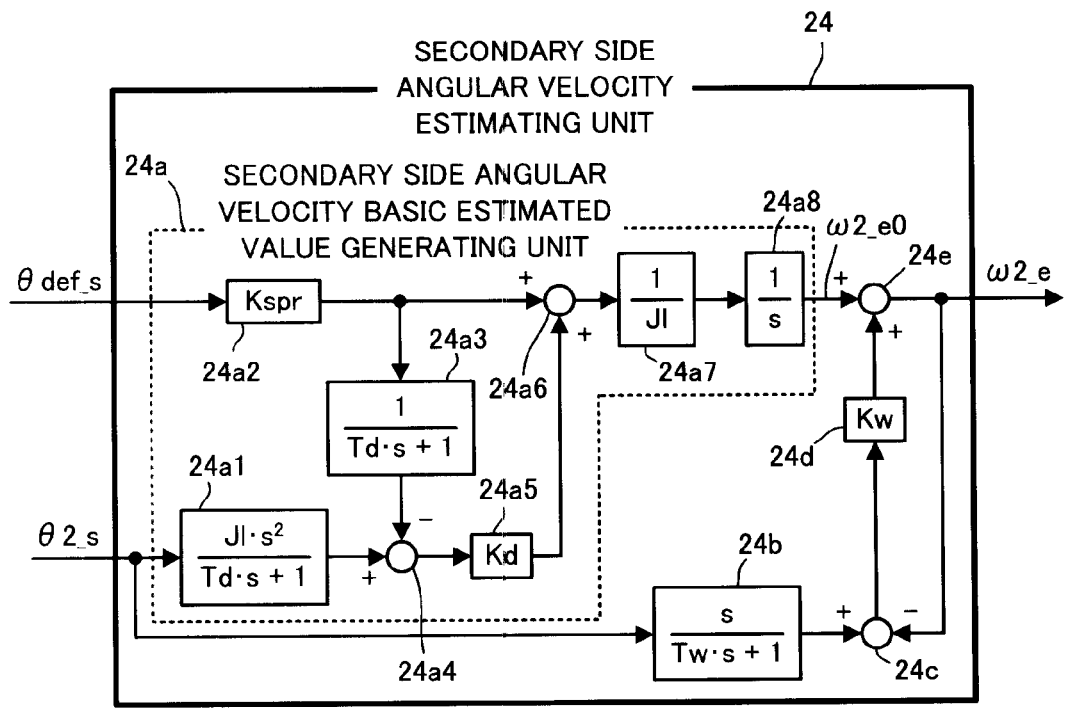
FIG. 4 is a block diagram showing a functional configuration of a secondary side angular velocity estimating unit shown in FIG. 2.

The secondary side angular velocity estimating unit 24 sequentially generates a secondary side rotational angular velocity estimated value ω2_e from these input values, by a process shown in the block diagram of FIG. 4.

To be more specific, the secondary side angular velocity estimating unit 24 executes a process of a secondary side angular velocity basic estimated value generating unit 24a. The secondary side angular velocity basic estimated value generating unit 24a executes a process of estimating a total input torque (acting force) acting on the driven rotary member 5, and calculating a value of integral which is obtained by integrating the estimated value of the rotational angular acceleration of the driven rotary member 5 generated by the input torque as a basic estimated value ω2_e0 of a secondary side rotational angular velocity ω2.

In more detail, the secondary side angular velocity basic estimated value generating unit 24a inputs the secondary side rotational angle measured value θ2_s, which is sequentially input from the secondary side angle measurement processing unit 21, to a filtered second-order differential processing unit 24a1. The filtered second-order differential processing unit 24a1 executes a process of calculating a value obtained by multiplying a predetermined value J1 to a second-order differential value $d^2θ2\_s/dt^2$ of θ2_s, and performing the low-pass filtering process to the calculated value. The low-pass filtering process is a filtering process in which the transfer function thereof is represented by 1/(Td·s+1) (the low-pass filtering process in which a time constant defining a cut-off frequency is Td).

The predetermined value J1 is a constant value preliminary set as an equivalent moment of inertia of the driven rotary member 5 (including elements on the load side rotating integrally therewith). Therefore, the value obtained by multiplying the predetermined value J1 to the second-order differential value $d^2θ2\_s/dt^2$ of θ2_s has a meaning as a value which is obtained by converting the second-order differential value $d^2θ2\_s/dt^2$ to the measured value of the total input torque acting on the driven rotary member 5. Therefore, the filtering value which is obtained by performing the low-pass filtering process to the measured value of the input torque of the driven rotary member 5 which is obtained by converting the second-order differential value $d^2θ2\_s/dt^2$ of θ2_s by the filtered second-order differential processing unit 24a1.

Further, the secondary side angular velocity basic estimated value generating unit 24a executes a process of multiplying a predetermined value Kspr to the primary side-secondary side rotational angular difference measured value θdef_s sequentially input from the primary side-secondary side angular difference measurement processing unit 22 by a multiplier 24a2. The predetermined value Kspr is a value preliminary set as a spring constant in relation to the torsion of the torsion bar 4. Therefore, by the process of the multiplier 24a2, the primary side-secondary side rotational angular difference measured value θdef_s (a measured value of a torsion angle of the torsion bar 4) is converted to a measured value of an elastic force torque generated by an elastic deformation of the torsion of the torsion bar 4. Hereinafter, the output value of the multiplier 24a2 will be referred to as an elastic force torque converted value.

Further, the secondary side angular velocity basic estimated value generating unit 24a inputs the elastic force torque converted value to a filter 24a3, and performs the low-pass filtering process to the elastic force torque converted value. The filter 24a3 is a filter in which the transfer function thereof is represented by 1/(Td·s+1), that is, the low-pass filter of the identical characteristics with the filtering process of the filtered second-order differential processing unit 24a1.

The time constant Td in the filtered second-order differential processing unit 24a1 and the filter 24a3 is set so that the cut-off frequency defined thereby becomes a frequency lower than a resonant frequency (natural frequency) according to the elastic characteristics of the torsion bar 4.

To supplement, the elastic characteristics of the speed reducer 3 has a higher rigidity than the elastic characteristics of the torsion bar 4. Therefore, the resonant frequency according to the elastic characteristics of the speed reducer 3 becomes a higher frequency than the resonant frequency according to the elastic characteristics of the torsion bar 4. Therefore, by setting the time constant Td as is explained above, the frequency component removed by each of the filtering process of the filtered second-order differential processing unit 24a1 and the filter 24a3 consequently includes not only the resonant frequency according to the elastic characteristics of the torsion bar 4 but also the resonant frequency according to the elastic characteristics of the speed reducer 3.

Subsequently, the secondary side angular velocity basic estimated value generating unit 24a executes a process of calculating a deviation between the output value of the filtered second-order differential processing unit 24a1 and the output value of the filter 24a3 by a calculator 24a4. Further, the secondary side angular velocity basic estimated value generating unit 24a executes a process of multiplying a gain Kd (≤1) of a predetermined value to the deviation calculated by the calculator 24a4 by a multiplier 24a5. Thereafter, the secondary side angular velocity basic estimated value generating unit 24a executes a process of adding the output value of the multiplier 24a5 to the elastic force torque converted value which is the output value of the multiplier 24a2 by a calculator 24a6.

In this case, the output value of the multiplier 24a5 which is added to the elastic force torque converted value has a meaning as an estimated value of an external torque (including torque caused by a frictional force) other than the elastic force torque acting on the driven rotary member 5 from the torsion bar 4. Therefore, the output value of the calculator 24a6 corresponds to an estimated value of a total input torque (acting force) acting on the driven rotary member 5.

Subsequently, the secondary side angular velocity basic estimated value generating unit 24a executes a process of multiplying an inverse number of the equivalent moment of inertia J1 (=1/J1) of the driven rotary member 5 to the output value of the calculator 24a6 by a multiplier 24a7. Further, the secondary side angular velocity basic estimated value generating unit 24a executes a process of integrating the output value of the multiplier 24a7 by an integrator 24a8.

As is explained above, because the output value of the calculator 24a6 corresponds to the estimated value of the total input torque acting on the driven rotary member 5, the output value of the multiplier 24a7 which becomes a value proportional to the output value of the calculator 24a6 has a meaning as an estimated value of a rotational angular acceleration of the driven rotary member 5. Therefore, the secondary side angular velocity basic estimated value generating unit 24a calculates a rotational angular velocity of the driven rotary member 5, by integrating the output value of the multiplier 24a7 by the integrator 24a8, and generates the calculated value as a basic estimated value $\omega2\_e0$ of a secondary side rotational angular velocity $\omega2$.

This completes the process of the secondary side angular velocity basic estimated value generating unit 24a.

In the present embodiment, the low-pass filtering process of the identical characteristics is separately performed by each of a filtered second-order differential processing unit 24a1 and the filter 24a3, however, this may be substituted by the following. That is, after calculating a deviation between a value in which the second-order differential value of the secondary side rotational angle measured value $\theta2\_s$ is converted to the input torque of the driven rotary member 5 ($=J1 \cdot d^2\theta2\_s/dt^2$) and the output value of the multiplier 24a2 (the elastic force torque converted value), the secondary side angular velocity basic estimated value generating unit 24a performs the low-pass filtering process (the filtering process in which the transfer function is represented by $1/(Td \cdot s+1)$ to the deviation. Thereafter, the filtering value of the deviation is input to the multiplier 24a5.

In addition to executing the process of the secondary side angular velocity basic estimated value generating unit 24a as is explained above, the secondary side angular velocity estimating unit 24 further inputs the secondary side rotational angle measured value $\theta2\_s$ to a filtered differentiation processing unit 24b. The filtered differentiation processing unit 24b executes a process of calculating a first-order differential value $d\theta2\_s/dt$ of $\theta2\_s$, and performing the low-pass filtering process to the calculated value. The low-pass filtering process is a filtering process in which the transfer function thereof is represented by $1/(Tw \cdot s+1)$ (the low-pass filtering process in which the time constant defining the cut-off frequency is Tw).

In this case, the time constant Tw is, in the present embodiment, set to a time value longer than the time constant Td of the filtered second-order differential processing unit 24a1 and the filter 24a3 of the secondary side angular velocity basic estimated value generating unit 24a. Therefore, the cut-off frequency is a frequency lower than the cut-off frequency of the filtered second-order differential processing unit 24a1 and the filter 24a3.

Thereafter, the secondary side angular velocity estimating unit 24 executes a process of calculating a deviation between the output value of the filter 24b and a latest value among the generated secondary side rotational angular velocity estimated values $\omega2\_e$ (the previous value calculated in the previous arithmetic processing cycle of the secondary side angular velocity estimating unit 24) by a calculator 24c.

Further, the secondary side angular velocity estimating unit 24 calculates the correction manipulated variable for correcting the basic estimated value $\omega2\_e0$ (the output value of the integrator 24a8), so as to converge the deviation calculated by the calculator 24c to 0 by the feedback control law. In this case, as the feedback control law, a proportional law for example will be used. That is, the secondary side angular velocity estimating unit 24 calculates the correction manipulated variable by executing the process of multiplying a proportional gain Kw of a predetermined value to the deviation by a multiplier 24d.

Subsequently, the secondary side angular velocity estimating unit 24 corrects the basic estimated value $\omega2\_e0$ by executing a process of adding the correction manipulated variable to the basic estimated value $\omega2\_e0$ by a calculator 24e, and generates the value after correction as the secondary side rotational angular velocity estimated value $\omega2\_e$.

By the process of the secondary side angular velocity estimating unit 24 explained above, the secondary side rotational angular velocity estimated value $\omega2\_e$ is sequentially generated while suppressing an excessive variation (a high-frequency fluctuation) in comparison to the first-order differential value $d\theta2\_s/dt$ of the secondary side rotational angle measured value $\theta2\_s$, and also while following the first-order differential value $d\theta2\_s/dt$. In this case, the basic estimated value $\omega2\_e0$ is calculated while adding the influence of external force acting on the driven rotary member 5 other than the elastic force torque of the torsion bar 4. Therefore, it becomes possible to increase the stability and reliability of the secondary side rotational angular velocity estimated value $\omega2\_e$.

To supplement, in the present embodiment, the secondary side angular velocity estimating unit 24 corresponds to a secondary side velocity estimating element. In this case, the secondary side rotating angular velocity $\omega2$ corresponds to a secondary side velocity.

Further, the secondary side angular velocity basic estimated value generating unit 24a corresponds to a secondary side velocity basic estimated value generating element of the present invention. In this case, the output value of the multiplier 24a2, the output value of the filter 24a3, the output value of the filtered second-order differential processing unit 24a1, the output value of the calculator 24a4, and the output value of the calculator 24a6 correspond to an elastic force converted value, an elastic force filtering value, an acting force basic filtering value, a force deviation, and an estimated value of a driven element acting force of the present invention, respectively.

Further, the filter 24b corresponds to a third filtering element of the present invention. In this case, the output value of the filter 24b corresponds to a secondary side velocity filtering value of the present invention.

Returning back to the explanation of FIG. 2, after executing the process of the primary side angular velocity estimating unit 23 and the secondary side angular velocity estimating unit 24 as is explained above, the control device 12 subsequently executes the process of the motor operation target determining unit 25.

The primary side rotational angular velocity estimated value $\omega 1\_e$ and the secondary side rotational angular velocity estimated value $\omega 2\_e$ are input to the motor operation target determining unit 25, and a target drive torque $\tau$ref which is a target value of the drive torque to be imparted to the driven rotary member 5 from the electric motor 2 side (the drive torque to be imparted to the driven rotary member 5 from the torsion bar 4) are sequentially input thereto.

Thereafter, a motor operation target determining unit 25 determines the operation target which defines the operation of the electric motor 2 using these input values. The operation target is, in the present embodiment, a target value which defines the rotating angular velocity of the output shaft $2b$ of the electric motor 2. More specifically, in the present embodiment, the operation target is a target value $\omega 1\_\text{cmd}$ of the primary side rotational angular velocity $\omega 1$ (=a target value of the rotational angular velocity of the output shaft $3b$ of the speed reducer 3). In this case, a value obtained by multiplying the speed reduction ratio R of the speed reducer 3 to the primary side rotational angular velocity target value $\omega 1\_\text{cmd}$ becomes the target value of the rotational angular velocity of the output shaft $2b$ of the electric motor 2.

Specifically, the motor operation target determining unit 25 sequentially determines the primary side rotational angular velocity target value $\omega 1\_\text{cmd}$ as is explained below.

That is, the motor operation target determining unit 25 executes a process of calculating a deviation $\Delta \omega 12$ between the input secondary side angular velocity estimated value $\omega 2\_e$ and the primary side angular velocity estimated value $\omega 1\_e$ (=$\omega 2\_e - \omega 1\_e$) by a calculator $25a$. Thereafter, the motor operation target determining unit 25 performs the low-pass filtering process to the output value $\Delta \omega 12$ by inputting the output value $\Delta \omega 12$ of the calculator $25a$ to a filter $25b$. In this case, the filter $25b$ is a low-pass filter in which its transfer function is represented by Tpa/(Tp1·s+1) (a low-pass filter including a process of multiplying a gain Tpa to the input value and a time constant defining the cut-off frequency is Tp1).

Further, the motor operation target determining unit 25 executes a process of multiplying an inverse number of the predetermined value Kspr as the spring constant of the torsion bar 4 (=1/Kspr) to the input target drive torque $\tau$ref by a multiplier $25c$. The target drive torque $\tau$ref is the target value of the drive torque acting on the driven rotary member 5 from the torsion bar 4, so that it has a meaning as a target value of the elastic force torque to be generated by the torsion bar 4. Therefore, the output value of the multiplier $25c$ (=$\tau$ref/Kspr) becomes a value obtained by converting the target drive torque $\tau$ref to a target value $\theta$def_cmd of the primary side-secondary side rotational angular difference $\theta$def which corresponds to a target value of an elastic deformation amount of the torsion bar 4.

Thereafter, the motor operation target determining unit 25 executes a process of calculating a deviation $\Delta \theta$def between the primary side-secondary side rotational angular difference target value $\theta$def_cmd calculated by the multiplier $25c$ as is explained above, and the input primary side-secondary side rotational angular difference measured value $\theta$def_$s$ (=$\theta$def_cmd−$\theta$def_s) by a calculator $25d$.

Further, the motor operation target determining unit 25 inputs the deviation $\Delta \theta$def calculated by the calculator $25d$ to a filter $25e$, and performs the low-pass filtering process to the deviation $\Delta \theta$def. In this case, the filter $25e$ is a low-pass filter in which its transfer function is expressed by Tpb/(Tp2·s+1) (a low-pass filter including a process of multiplying a gain Tpb to the input value, and in which a time constant defining the cut-off frequency is Tpb).

The time constants Tp1, Tp2 of the filters $25b$, $25e$, respectively, are set to time values shorter than the time constants Td, Tw in the secondary side angular velocity estimating unit 24, and the cut-off frequencies of the filters $25b$, $25e$ defined by respective time constants Tp1, Tp2 are set so as to become frequencies lower than the resonant frequency corresponding to the elastic characteristics of the speed reducer 3.

In addition, the values of the time constants Tp1, Tp2, and the values of the respective gains Tpa, Tpb are set so as to realize a function similar to a phase-lead compensation by combining the filters $25b$, $25e$. In this case, for example, the time constants Tp1, Tp2 are set to values different from each other so that it becomes Tp1>Tp2, and Tpa and Tpb are set to values different from each other so that it becomes Tpa>Tpb.

Subsequently, the motor operation target determining unit 25 executes a process of adding up the output values of the filters $25b$, $25e$ by a calculator $25f$. Further, the motor operation target determining unit 25 determines the primary side rotational angular velocity target value $\omega 1\_\text{cmd}$, by executing a process of multiplying a gain Kcmp of a predetermined value to the output value of the calculator $25f$, by a multiplier $25g$.

The above is the details of the process of the motor operation target determining unit 25.

To supplement, in the present embodiment, the motor operation target determining unit 25 corresponds to an actuator operation target determining element of the present invention. In this case, the primary side rotational angular velocity target value $\omega 1\_\text{cmd}$ corresponds to an operation target of the present invention.

Further, the filters $25b$, $25e$ correspond to a first filtering element, and a second filtering element of the present invention, respectively. In this case, the output value of the filter $25b$ corresponds to a first filtering value of the present invention, and the output value of the filter $25e$ corresponds to a second filtering value of the present invention. Further, the target drive torque $\tau$ref corresponds to a target driving force of the present invention, and the output value of the multiplier $25c$ corresponds to a target value of an elasticity measured amount of the present invention. Further, the output value of the calculator $25f$ corresponds to a linear combination of the present invention.

In the present embodiment, the calculator $25d$ calculated the deviation $\Delta \theta$def between the target value $\theta$def_cmd of the primary side-secondary side rotational angular difference $\theta$def and the primary side-secondary side rotational angular difference measured value $\theta$def_s. However, the following may be adapted as a substitute thereof. That is, a deviation between the target drive torque $\tau$ref and a value obtained by multiplying the predetermined value Kspr as the spring constant of the torsion bar 4 to the primary side-secondary side rotational angular difference measured value $\theta$def_$s$ (that is, a value obtained by converting $\theta$def_$s$ to the elastic force torque of the torsion bar 4), and the deviation is input to the filter $25e$.

Further, in the present embodiment, the primary side rotating angular velocity target value $\omega 1\_\text{cmd}$ is determined as the operation target defining the operation of the electric motor 2. However, as a substitute for $\omega 1\_\text{cmd}$, the target value of the rotational angular velocity of the output shaft $2b$ of the electric motor 2 may be determined.

Subsequently, the control device 12 executes a process of the motor control unit 26. To the motor control unit 26, the primary side rotating angular velocity target value ω1_cmd and the primary side rotational angular velocity estimated value ω1_e are sequentially input from the motor operation target determining unit 25 and the primary side angular velocity estimating unit 23, respectively, and the primary side-secondary side rotational angular difference target value θdef_cmd is input from the motor operation target determining unit 25.

Thereafter, the motor control unit 26 performs the operational control of the electric motor 2 using these input values.

Specifically, the motor control unit 26 executes a process of multiplying a gain Ktff of a predetermined value to the input primary side-secondary side rotational angular difference target value θdef_cmd by a multiplier 26a, and determines a basic target value τ_ff which is a feedforward target value of the output torque of the electric motor 2.

The value of the gain Ktff is a value obtained by dividing the predetermined value Kspr as the spring constant of the torsion bar 4 by the speed reduction ratio R of the speed reducer (=Kspr/R). Therefore, the basic target value τm_ff of the output torque of the electric motor 2 may be determined by dividing the target drive torque τref by the speed reduction ratio R of the speed reducer 3.

Further, the motor control unit 26 executes a process of calculating a deviation Δω1 between the input primary side rotational angular velocity target value ω1_cmd and the primary side rotational angular velocity estimated value ω1_e (=ω1_cmd−ω1_e) by a calculator 26b.

Thereafter, the calculator 26b determines the correction manipulated variable τm_fb for correcting the basic target value τm_ff so as to converge the deviation Δω1 calculated by a calculator 26 to converge to 0 by the feedback control law. In this case, as the feedback control law, a proportional law is used. That is, the motor control unit 26 determines the correction manipulated variable τm_fb by executing a process of multiplying a proportional gain Kv of a predetermined value to the deviation Δω1 by a multiplier 26c.

Subsequently, the calculator 26b determines the target motor torque τm_cmd which is a target value of the output torque of the electric motor 2, by executing a process of adding the correction manipulated variable τm_fb which is the output value of the multiplier 26c to the basic target value τ_ff which is the output value of the multiplier 26a (a process of correcting the basic target value τ_ff by the correction manipulated variable τm_fb) by the calculator 26.

The target motor torque τm_cmd determined by the motor control unit 26 as explained above is input to the primary side angular velocity estimating unit 23 as the power target parameter.

Subsequently, the motor control unit 26 converts the target motor torque τm_cmd to a current command value Im_cmd which is a target value of an energization current of an armature winding wire (not shown) of the electric motor 2, by executing a process of multiplying a torque-current converting coefficient Kti of a predetermined value to the target motor torque τm_cmd determined as explained above.

Thereafter, the motor control unit 26 controls the energization current of the armature winding wire of the electric motor 2, by executing a process of a current control unit 26f according to the current command value Im_cmd. More specifically, the current control unit 26f detects the energization current of the armature winding wire of the electric motor 2 by a current sensor which is not shown, and feedback controls the energization current of the armature winding wire of the electric motor 2, so as to converge the detected value to the current command value Im_cmd. By doing so, the actual output torque of the electric motor 2 is controlled so as to coincide with the target motor torque τm_cmd.

In the present embodiment, the process of the motor control unit 26 mentioned above (or the process of the current control unit 26f out of the motor control unit 26) is executed with high speed at a shorter arithmetic processing cycle than each function units 20 through 25 of the control device 12 mentioned above.

To supplement, in the present embodiment, the motor control unit 26 corresponds to an actuator control element of the present invention. Further, a power target parameter generating element of the present invention is realized by the process of the multiplier 26a, the calculator 26b, and the multiplier 26c of a motor control unit 26. In this case, the target motor torque τm_cmd corresponds to the power target parameter.

In the present embodiment explained above, the primary side rotational angular velocity estimated value ω1_e is generated so as to suppress excessive fluctuation compared to the first-order differential value of the primary side rotational angle measured value θ1_s, and so as to follow the first-order differential value, by the process of the primary side angular velocity estimating unit 23.

Further, the secondary side rotational angular velocity estimated value ω1_e is generated so as to suppress excessive fluctuation compared to the first-order differential value of the primary side rotational angle measured value θ1_s, and so as to follow the first-order differential value, by the process of the secondary side angular velocity estimating unit 24. In this case, the frequency components on the high-frequency side including the resonant frequencies corresponding to the elastic characteristics of the speed reducer 3 or the torsion bar 4 are removed, by the filtering process of the filtered second-order differential processing unit 24a1, the filter 24a3, and the filtered differentiation processing unit 24b. Therefore, the frequency components are prevented from influencing the secondary side rotational angular velocity estimated value ω1_e.

Thereafter, the primary side rotational angular velocity target value ω1_cmd as the operation target of the electric motor 2 is determined, according to the linear combination of the filtering value which is obtained by performing the low-pass filtering process to the deviation Δθdef between the primary side-secondary side rotational angular difference target value θdef_cmd which is obtained by converting the target drive torque τref and the primary side-secondary side rotational angular difference measured value θdef_s by the filter 25e, and the filtering value obtained by performing the low-pass filtering process to the deviation Δω12 between the secondary side rotational angular velocity estimated value ω2_e and the primary side rotational angular velocity estimated value ω1_e by the filter 25b.

In this case, the primary side rotational angular velocity target value ω1_cmd may be determined so as to be able to effectively suppress the driving torque transmitted from the electric motor 2 to the driven rotary member 5 from vibrating caused by the elastic property of the speed reducer 3 or the elastic property of the torsion bar 4 and the like, by appropriately setting the cut-off frequencies of the filters 25b, 25e to frequencies different from each other, and by appropriately setting the gain of the filters 25b, 25e.

Consequently, the actual drive torque to be imparted to the driven rotary member 5 may be controlled to the target drive torque τref with high robustness and stably.

Figure 5A:
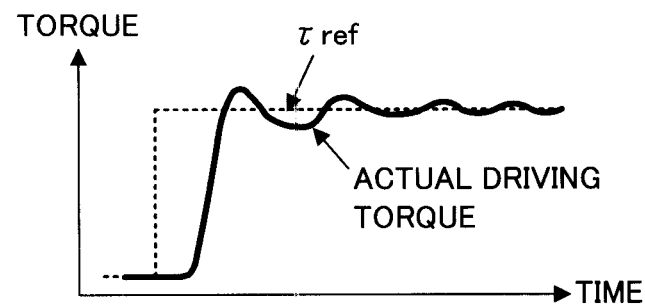
FIG. 5(a) is a graph exemplifying control characteristics of a drive torque of the power device in working examples.

With reference to FIG. 5, a validation example of the effect realized by the device of the present embodiment will be explained. FIG. 5(*a*) is a graph showing a working example of the torque control by the device of the present embodiment. More specifically, FIG. 5(a) shows in solid line a response waveform of the actual driving torque (the driving torque actually imparted to the driven rotary member 5), in the case where the target drive torque τref is changed stepwise as is shown by a broken line in the figure, with the device of the present embodiment.

Figure 5B:
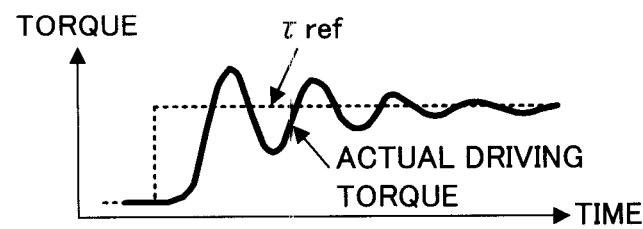
FIG. 5(b) is a graph exemplifying the control characteristics of the driving torque of the power device in comparative examples.

Further, FIG. 5(b) is a graph showing a comparative example. More specifically, FIG. 5(b) shows in solid line a response waveform of the actual driving force, in the case where the target driving torque τref is changed stepwise as is shown by a broken line in the figure, in the comparative example. In the comparative example, the actual driving torque is simply feedback controlled to the target driving torque τref. More specifically, for example, the primary side rotational angular velocity target value $\omega 1\_cmd$ is determined by a feedback control law from the deviation $\Delta\theta def$ between the primary side-secondary side rotational angular difference target value $\theta def\_cmd$ corresponding to the target driving torque τref and the primary side-secondary side rotational angular difference measured value $\theta def\_s$, and the energization control of the electric motor 2 is performed by inputting the value to the motor control unit 26.

As can be understood by comparing FIG. 5(a) and (b), in the working example using the device of the present embodiment, compared to the comparative example, the actual driving torque has prompt responsiveness with respect to the change in the target driving torque τref, and also the vibration of the actual driving torque promptly damps and converges to the target driving torque τref.

Next, some variations of the embodiments explained above will be explained.

In the above-mentioned embodiments, a secondary side angular velocity estimating unit 24 is equipped with the secondary side angular velocity basic estimated value generating unit 24a, however, this may be omitted and the secondary side rotational angular velocity estimated value $\omega 2\_e$ may be generated as follows. That is, the output value of the filtered differentiation processing unit 24b itself may be generated as the secondary side rotational angular velocity estimated value $\omega 2\_e$. By doing so, an embodiment of the third aspect of the invention may be established.

Further, for example, in the case where the external torque acting on the driven rotary member 5 other than the elastic force torque generated by the torsion bar 4 is 0, or is sufficiently small compared to the elastic force torque, the secondary side angular velocity basic estimated value generating unit 24a may omit the process of the filtered second-order differential processing unit 24a1, the filter 24a3, the calculator 24a4, and the multiplier 24a5 (or set the gain Kd in the multiplier 24a5 to 0).

That is, the basic estimated value $\omega 2\_e0$ of the secondary side rotational angular velocity may be calculated from an elastic force converted value which is obtained by converting the primary side-secondary side rotational angular difference measured value $\theta def\_s$ to the elastic force of the torsion bar 4 ($=\theta def\_s \cdot Kspr$) via the multiplier 24a7 and the integrator 24a8.

Further, in the above-mentioned embodiments, explanations were given by taking the case where the driven element is a driven rotary member 5 as an example. However, the driven element may be an element performing translational movement. In this case, as the first power transmission element, a speed reducer having a mechanism of converting the rotational driving force of the rotational actuator such as an electric motor to the translational force with a ball screw and the like may be used. Further, as the second power transmission element (spring member), for example, a coil spring may be used.

Further, the actuator is not limited to the electric motor, and may be, for example, a hydraulic actuator.

INDUSTRIAL APPLICABILITY

The present invention explained above may be effectively utilized to a power device for transmitting power from the actuator to, for example a driven element such as a joint of a robot such as a legged mobile robot, via a power transmission element having elastic characteristics such as a strain wave gearing or a spring member and the like.

EXPLANATION OF REFERENCES

1 . . . power device, 2 . . . electric motor (actuator), 3 . . . speed reducer (first power transmission element), 4 . . . torsion bar (spring member, second power transmission element), 5 . . . driven rotary member (driven element), 12 . . . control device, 20 . . . primary side angle measurement processing unit (primary side displacement measuring element), 21 . . . secondary side angle measurement processing unit (secondary side displacement measuring element), 22 . . . primary side-secondary side angular difference measurement processing unit (primary side-secondary side displacement difference measuring element), 23 . . . primary side angular velocity estimating unit (primary side velocity estimating element), 23a . . . filter (target power filtering element), 23b . . . differentiator (correcting element), 23c . . . calculator (correcting element), 23d . . . multiplier (correcting element), 23e . . . calculator (correcting element), 24 . . . secondary side angular velocity estimating unit (secondary side velocity estimating element), 24a . . . secondary side angular velocity basic estimated value generating unit (secondary side velocity basic estimated value generating element), 24b . . . filter (third filtering element), 25 . . . motor operation target determining unit (actuator operation target determining element), 25b . . . filter (first filtering element), 25e . . . filter (second filtering element), 26 . . . motor control unit (actuator control element), 26a . . . multiplier (power target parameter generating element), 26b . . . calculator (power target parameter generating element), 26c . . . multiplier (power target parameter generating element).

What is claimed is:

1. A control device of a power device, the power device including an actuator, a first power transmission element having elastic characteristics with an input unit thereof being connected to a power output unit of the actuator, a second power transmission element with an input unit thereof being connected to an output unit of the first power transmission element and which converts and outputs a power imparted to the input unit of the second power transmission element to an elastic force, and a driven element which is connected to an output unit of the second power transmission element, and which performs an operational movement by a driving force transmitted from the actuator via the first power transmission element and the second power transmission element, in which the first power transmission element is more rigid than the second power transmission element, and the control device which controls the driving force actually imparted to the driven element from the actuator to a target driving force, the control device comprising at least one processor, the at least one processor programmed to enable the at least one processor to execute:

a primary side displacement measuring module which generates an output indicating a value of an actual displacement of the input unit of the second power transmission element;

a secondary side displacement measuring module which generates an output indicating a value of an actual displacement of the driven element;

a primary side-secondary side displacement difference measuring module which generates an output indicating a measured value of a primary side-secondary side displacement difference which is a difference between the actual displacement of the input unit of the second power transmission element and the actual displacement of the driven unit;

a primary side velocity estimating module which generates an estimated value of a primary side velocity which is an estimated velocity of the input unit of the second power transmission element, at least based on the value of the primary side displacement;

a secondary side velocity estimating module which generates an estimated value of a secondary side velocity which is an estimated velocity of the driven element, at least based on the value of the secondary side displacement;

a first filtering module which generates a first filtered value which is obtained by performing a low-pass filtering process to a deviation between the estimated value of the secondary side velocity and the estimated value of the primary side velocity;

a second filtering module which generates a second filtered value which is obtained by performing a low-pass filtering process to a deviation between a value of an elasticity measured amount, which is either one of the measured value of the primary side-secondary side displacement difference or an elastic force converted value which is obtained by converting the measured value of the primary side-secondary side displacement difference to an elastic force generated by the second power transmission element, and a target value of the elasticity measured amount defined by the target driving force;

an actuator operation target determining module which determines an operation target defining an operation of the actuator according to a linear combination of the first filtered value and the second filtered value; and an actuator control module which controls the operation of the actuator according to the determined operation target.

2. The control device of the power device according to claim 1,
wherein the first power transmission element is a speed reducer, and the second power transmission element is a spring member.

3. The control device of the power device according to claim 1,
wherein the secondary side velocity estimating module is a module which generates a value obtained by performing a low-pass filtering process to a first-order differential value of the value of the secondary side displacement as the estimated value of the secondary side velocity.

4. The control device of the power device according to claim 1,
the at least one processor of the control device further programmed to enable the at least one processor to execute:
a secondary side velocity basic estimated value generating module which estimates a driven element acting force which is a force acting on the driven element, on the basis of at least the measured value of the primary side-secondary side displacement difference, and which generates a value proportional to a value of an integral of the estimated value of the driven element acting force as a basic estimated value of the secondary side velocity; and
a third filtering module which generates a secondary side velocity filtered value which is a value obtained by performing a low-pass filtering process to the first-order differential value of the value of the secondary side displacement;
wherein the secondary side velocity estimating module is a module which calculates a correction manipulated variable, according to a deviation between the secondary side velocity filtered value and the generated estimated value of the secondary side velocity, so as to converge the deviation to 0 by a feedback control law, and which generates a value obtained by correcting the basic estimated value of the secondary side velocity by the correction manipulated variable as the estimated value of the secondary side velocity.

5. The control device of the power device according to claim 4,
wherein the secondary side velocity basic estimated value generating module comprises:
a module which generates the elastic force converted value which is obtained by converting the measured value of the primary side-secondary side displacement difference to the elastic force generated by the second power transmission element;
a module which calculates a force deviation which is a deviation between an elastic force filtered value which is obtained by performing a low-pass filtering process to the elastic force converted value, and an acting force basic filtered value which is obtained by performing a low-pass filtering process to a value obtained by converting a second-order differential value of the value of the secondary side displacement to the force acting on the driven element; and
a module which calculates an estimated value of the driven element acting force by correcting the elastic force converted value according to the force deviation.

6. The control device of the power device according to claim 1,
the at least one processor of the control device further programmed to enable the at least one processor to execute:
a power target parameter generating module which generates a power target parameter which defines a target power to be output from the power output unit of the actuator in order to realize the operation target, at least according to the operation target;
a target power filtering module which generates a target power filtered value which is obtained by performing the low-pass filtering process to the target power defined by the power target parameter; and
a correcting module which calculates a correction manipulated variable of the target power filtered value, according to a deviation between the first-order differential value of the value of the primary side displacement and the generated estimated value of the primary side velocity, so as to converge the deviation to 0 by a feedback control law, and corrects the target power filtered value by the correction manipulated variable;
wherein the primary side velocity estimating module is a module which generates a value proportional to a value of an integral of the target power filtered value corrected by the correcting module, as the estimated value of the primary side velocity.

* * * * *